(12) United States Patent
Davies

(10) Patent No.: US 8,346,509 B2
(45) Date of Patent: Jan. 1, 2013

(54) CONTEXT SWITCH SAMPLING

(75) Inventor: Robert Davies, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 12/420,815

(22) Filed: Apr. 8, 2009

(65) Prior Publication Data

US 2010/0262870 A1 Oct. 14, 2010

(51) Int. Cl.
*G06F 11/30* (2006.01)
*G21C 17/00* (2006.01)

(52) U.S. Cl. .................. 702/186; 702/182; 719/318

(58) Field of Classification Search ............ 702/182, 702/186, 127; 377/1, 16, 44; 711/173, 202; 712/219, 224, 227; 714/39, 47.1, 47.2; 719/318
See application file for complete search history.

(56) References Cited

U.S. PATENT DOCUMENTS

| | | | |
|---|---|---|---|
| 5,615,135 A * | 3/1997 | Waclawsky et al. | 702/182 |
| 6,356,615 B1 * | 3/2002 | Coon et al. | 377/16 |
| 6,519,310 B2 * | 2/2003 | Chapple | 377/1 |
| 7,779,238 B2 * | 8/2010 | Kosche et al. | 712/227 |
| 2006/0167658 A1 | 7/2006 | Mericas | |
| 2008/0177756 A1 | 7/2008 | Kosche et al. | |
| 2009/0235056 A1 | 9/2009 | Hirai et al. | |

FOREIGN PATENT DOCUMENTS

| | | |
|---|---|---|
| JP | 05-151004 A | 6/1993 |
| JP | 07-307727 A | 11/1995 |
| JP | 2009-223451 A | 10/2009 |
| JP | 2010-152458 A | 7/2010 |

OTHER PUBLICATIONS

European Search Report for European Patent Application No. 10250736.5, mailed on Nov. 15, 2010, 4 pages.
Office Action Received for European Patent Application No. 10250736.5, mailed on Feb. 17, 2011, 6 pages.
Office Action Received for Japanese Patent Application No. 2010-088905, mailed on Nov. 1, 2011, 2 pages of Office Action and 2 pages of English Translation.
Office Action Received for Chinese Patent Application No. 201010207270.1, mailed on Jan. 12, 2012, 7 pages of Office Action and 7 pages of English Translation.
Office Action Received for Japanese Patent Application No. 2010-088905, mailed on Sep. 4, 2014, 2 pages of Office Action and 2 pages of English Translation.

* cited by examiner

*Primary Examiner* — John H Le
(74) *Attorney, Agent, or Firm* — Caven & Aghevli LLC

(57) ABSTRACT

A method for performance monitoring in a computing system is described. In some embodiments, an addressable memory stores data and instructions for performing context switch sampling. A processor includes hardware event counters, and is coupled with the addressable memory to access said instructions and in response to said instructions, the processor counts occurrences of a first hardware event in a first hardware event counter and counts occurrences of a second hardware event in a second hardware event counter. After a specified number of occurrences of the first hardware event have been counted, the second hardware event counter is sampled and hardware event counters are reset. In some embodiments the processor counts occurrences of segment register load events in the first hardware event counter and then records the sampled second hardware event counter value with a process identifier value and/or a thread identifier value.

33 Claims, 3 Drawing Sheets

CONTEXT SWITCH SAMPLING

FIELD OF THE DISCLOSURE

This disclosure relates generally to the field of microprocessors. In particular, the disclosure relates to context switch sampling of process or thread events based on hardware event triggers in a processor.

BACKGROUND OF THE DISCLOSURE

In multitasking, multiprocessing and/or multithreading systems, monitoring performance metrics may be complicated. Techniques that have been used in the past such as time-based sampling or event-based sampling employ a consistent regular grid of measurement to outline and characterize the behavior of applications whose activity may at times be anything but regular.

Previous attempts to monitor activity within the context of a particular process may have required specially instrumented versions of the operating system. These techniques may also have the side effect of monitoring the special instrumentation as well as the desired performance metrics in the context of the particular process of interest. Thus results of previous techniques may have been contaminated by activity from other processes, threads or operating system instrumentation.

To date, more efficient performance monitoring in multitasking, multiprocessing and/or multithreading systems to avoid contamination by events captured from other processes and/or threads have not been fully explored.

BRIEF DESCRIPTION OF THE DRAWINGS

The present invention is illustrated by way of example and not limitation in the figures of the accompanying drawings.

DETAILED DESCRIPTION

Methods for performance monitoring in a computing system are described below. In some embodiments, an addressable memory stores data and instructions for performing context switch sampling. A processor includes hardware event counters for performance monitoring, and is coupled with the addressable memory to access said instructions and in response to said instructions, the processor counts occurrences of a first hardware event in a first hardware event counter and counts occurrences of a second hardware event in a second hardware event counter. After a specified number of occurrences of the first hardware event have been counted, it can be determined that a context switch has occurred. The second hardware event counter is then sampled and the hardware event counters are reset. In some embodiments the processor counts occurrences of segment register load events in the first hardware event counter and then records the sampled second hardware event counter value together with a process identifier value and/or a thread identifier value.

Thus, such techniques may be used to more accurately capture and measure events for a particular process and/or thread without including contamination from events captured from other processes and/or threads.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
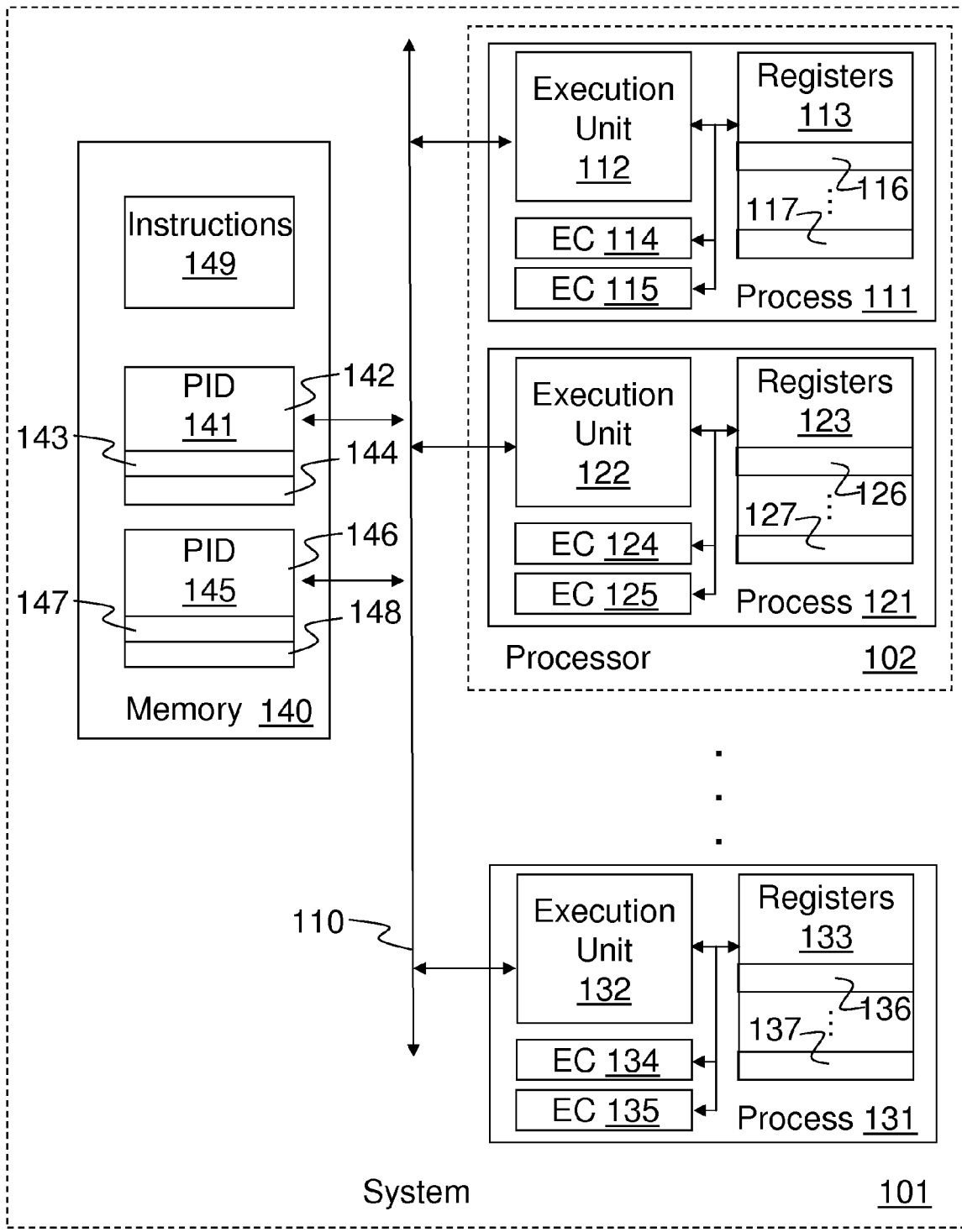
FIG. 1 illustrates one embodiment of a multiprocessing system for performing context switch sampling.

FIG. 1 illustrates one embodiment of a multiprocessing system 101 for performing context switch sampling. Embodiments of system 101 may include addressable memory 140 having storage areas 141-149 to store data and machine executable instructions for performing context switch sampling. Multiple processes 111-131 are coupled with addressable memory 140 via a bus or any other interconnect 110 and processes 111-131 concurrently execute their respective threads. It will be appreciated that embodiments of processes 111-131 may include software processes or hardware threads or multiple individual processor cores on different dies or on the same die. Some embodiments of system 101 may also include processors such as processor 102, which has multiple hardware thread processes 111 and 121.

Processes 111-131 respectively include execution units 112-132, registers 113-133, and hardware event counters 114-134 and 115-135. It will be appreciated that in some embodiments one or more of execution units 112-132 may be physically shared by some of processes 111-131. It will also be appreciated that in some embodiments of processes 111-131, registers 113-133, and/or hardware event counters 114-134 and 115-135 may also be shared or used in common by some of processes 111-131. One or more processes 111-131 may be coupled with the addressable memory 140 to access machine executable instructions 149, and responsive to machine executable instructions 149, one or more of processes 111-131 may count occurrences of a first hardware event in hardware event counters 114-134 respectively. In some embodiments the first hardware event may be a segment register load event, as is used in context switches on "x86" processors, such as those manufactured by Intel Corp. of Santa Clara, Calif. It will be appreciated that by counting occurrences of a hardware event such as a segment register load event in hardware event counters 114-134 respectively, the one or more processes 111-131 may be able to determine when a context switch has occurred.

For example, a given operating system running on a specific x86 processor may need to execute four segment register loads in order to perform a context switch between application processes at ring 3. By setting a sample-after value (SAV) to sample hardware event counters after the count of exceeds four, the value of the sampled hardware event counters more accurately capture and measure events for a particular process and/or thread without including contamination from events captured from other processes and/or threads. In particular, if a SAV count is set to eight (twice four) a context switch between processes will have been detected. On the other hand if a SAV count is set to five (one more than four) a context switch between threads of the same process will have been detected. If a SAV count is set at or below the critical value (in this example, four) then sampling will fail to capture the desired application data, since sampling will occur prior to collecting event statistics in the desired application. It will be appreciated that the number of segment register loads needed to detect a context switch may vary greatly (e.g. between 1 and over 100 segment register loads) from operating system to operating system depending on the particular operating system and on the particular processor.

It will be appreciated that some embodiments may use other techniques or instructions rather than segment register loads in order to perform context switch sampling. For example, a context switch may also be associated with loading of descriptor tables, and so triggering the sampling of event count data following the loading of descriptor tables (either global or local) may provide an alternative technique to perform context switch sampling. In another alternative embodiment, a particular address in addressable memory 140 may be selected for the express purpose of triggering context switch sampling, whenever that address is accessed. In yet another alternative embodiment, a hardware event trigger whenever a process and/or thread identifier is changed may be used, or a special instruction may be added to the processor architecture specifically to trigger context switch sampling.

After the specified number of occurrences of the first hardware event have been counted in hardware event counters 114-134 respectively, the second hardware event counters, 115-135 respectively, are sampled and the first and second hardware event counters 114-134 and 115-135 respectively, are reset. As pointed out above, it will be appreciated that embodiments of processes 111 and 121, may share or use in common hardware event counters 114-124 and 115-125, so processor 102, for example, may have just a single set of hardware event counters.

After the specified number of occurrences of the first hardware event have been counted and the second hardware event counters, 115-135 respectively, have been sampled the sampled second hardware event counter 115-135 values may be recorded and/or accumulated in storage locations 143-147 with a process identifier 141-145 value in addressable memory 140. In some embodiments the sampled second hardware event counter 115-135 values may also be recorded and/or accumulated in storage locations 143-147 with a thread identifier 144-148 value in addressable memory 140.

It will be appreciated that such techniques may be used to more accurately capture and measure hardware events for a particular process and/or thread without including contamination from hardware events captured from other processes and/or threads.

Figure 2:
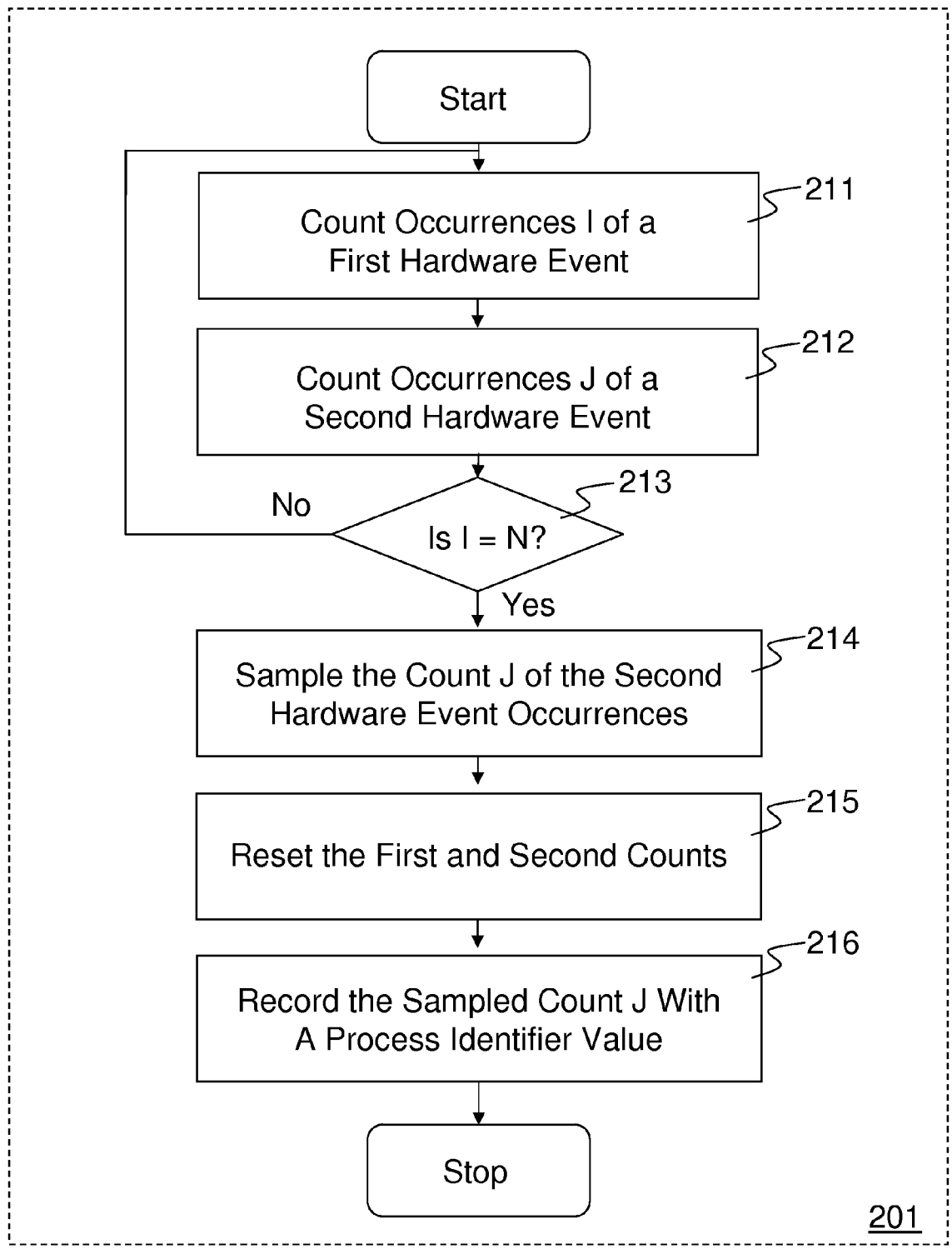
FIG. 2 illustrates a flow diagram for one embodiment of a process for performing context switch sampling.

FIG. 2 illustrates a flow diagram for one embodiment of a process 201 to perform context switch sampling for performance monitoring in a multiprocessing system. Process 201 and other processes herein disclosed are performed by processing blocks that may comprise dedicated hardware or software or firmware operation codes executable by general purpose machines or by special purpose machines or by a combination of both.

In processing block 211, I occurrences of a first hardware event are counted in a first hardware event counter (e.g. one of ECs 114-134). In processing block 212, J occurrences of a second hardware event are counted in a second hardware event counter (e.g. one of ECs 115-135). In processing block 213, it is determined whether I is equal to a predetermined SAV value N. If not counting continues in processing block 211. Otherwise processing proceeds to processing block 214 where the count J of second hardware event occurrences in the second hardware event counter is sampled. Then in processing block 215 the first and second hardware event counters are reset, and in processing block 216, the sampled count J is recorded (e.g at locations 143-147) in addressable memory 140 with a process identifier (e.g 141-145) value.

Figure 3:
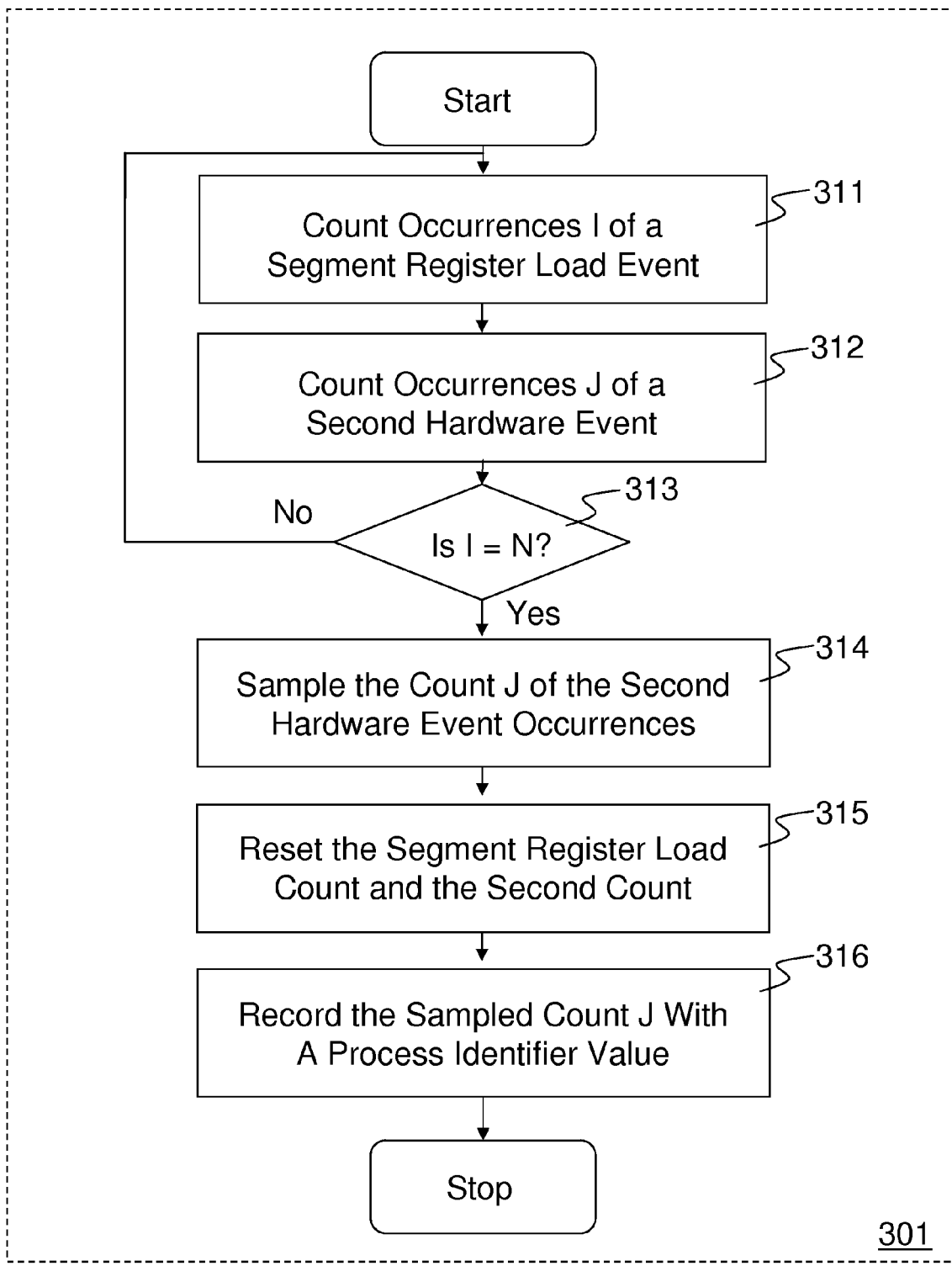
FIG. 3 illustrates a flow diagram for an alternative embodiment of a process for performing context switch sampling.

FIG. 3 illustrates a flow diagram for an alternative embodiment of a process 301 for performing context switch sampling.

In processing block 311, I occurrences of a segment register load event are counted in a first hardware event counter (e.g. one of ECs 114-134). In processing block 312, J occurrences of a second hardware event are counted in a second hardware event counter (e.g. one of ECs 115-135). In processing block 313, it is determined whether I is equal to a predetermined SAV value N. If not counting continues in processing block 311. Otherwise processing proceeds to processing block 314 where the count J of second hardware event occurrences in the second hardware event counter is sampled. Then in processing block 315 the segment register load event count and the second hardware event count in the first and second hardware event counters are reset, and in processing block 316, the sampled count J is recorded (e.g at locations 143-147) in addressable memory 140 with a process identifier (e.g 141-145) value.

It will be appreciated that processes 201 and 301 may be able to determine when a context switch has occurred, and hence be used to accurately capture and measure hardware events for a particular process and/or thread without including contamination from hardware events captured during execution of other processes and/or threads.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for performance monitoring in a multiprocessing system, the method comprising:
   counting occurrences of a first hardware event in a first hardware event counter of a processor;
   counting occurrences of a second hardware event in a second hardware event counter of the processor;
   sampling the second hardware event counter after a specified number of occurrences of the first hardware event have been counted, and resetting the first and second hardware event counters, wherein a value corresponding to the sampled second hardware event is to be stored in a storage device, wherein both the first hardware event counter and the second hardware event counter of the processor are to be utilized for a particular process and/or thread without including contamination from events captured from other processes and/or threads.

2. The method of claim 1 wherein said first hardware event is a descriptor table load event.

3. The method of claim 2 wherein said first hardware event is a local descriptor table load event.

4. The method of claim 1 wherein said first hardware event is a segment register load event.

5. The method of claim 1 wherein said first hardware event is a memory load event from an address predetermined to trigger the sampling of the second hardware event counter.

6. The method of claim 1 wherein said first hardware event is a process identifier change event.

7. The method of claim 1 further comprising:
   recording the sampled second hardware event counter value with a process identifier value.

8. The method of claim 1 wherein said first hardware event is a thread identifier change event.

9. The method of claim 1 further comprising:
   recording the sampled second hardware event counter value with a thread identifier value.

10. A method for performance monitoring in a multiprocessing system, the method comprising:
  counting occurrences of a segment register load event in a first hardware event counter of a processor;
  counting occurrences of a second hardware event in a second hardware event counter of the processor;
  sampling the second hardware event counter after a specified number of occurrences of the segment register load event have been counted, and resetting the first and second hardware event counters, wherein a value corresponding to the sampled second hardware event is to be stored in a storage device, wherein both the first hardware event counter and the second hardware event counter of the processor are to be utilized for a particular process and/or thread without including contamination from events captured from other processes and/or threads.

11. The method of claim 10 further comprising:
  recording the sampled second hardware event counter value with a process identifier value.

12. The method of claim 11 further comprising:
  recording the sampled second hardware event counter value and the process identifier value with a thread identifier value.

13. An article of manufacture for performance monitoring in a multiprocessing system, the article comprising:
  a machine-accessible medium including data and instructions for performing context switch sampling such that, when accessed by a machine, cause the machine to:
    count occurrences of a first hardware event in a first hardware event counter;
    count occurrences of a second hardware event in a second hardware event counter;
    sample the second hardware event counter after a specified number of occurrences of the first hardware event have been counted, and reset the first and second hardware event counters, wherein both the first hardware event counter and the second hardware event counter of the processor are to be utilized for a particular process and/or thread without including contamination from events captured from other processes and/or threads.

14. The article of claim 13 wherein said first hardware event is a descriptor table load event.

15. The article of claim 14 wherein said first hardware event is a local descriptor table load event.

16. The article of claim 13 wherein said first hardware event is a segment register load event.

17. The article of claim 13 wherein said first hardware event is a memory load event from an address predetermined to trigger the sampling of the second hardware event counter.

18. The article of claim 13 wherein said first hardware event is a process identifier change event.

19. The article of claim 13, said machine-accessible medium including data and instructions such that, when accessed by the machine, causes the machine to:
  recording the sampled second hardware event counter value with a process identifier value.

20. The article of claim 13 wherein said first hardware event is a thread identifier change event.

21. The article of claim 13, said machine-accessible medium including data and instructions such that, when accessed by the machine, causes the machine to:
  recording the sampled second hardware event counter value with a thread identifier value.

22. A computing system comprising:
  an addressable memory to store data and machine executable instructions for performing context switch sampling;
  a processor including a first hardware event counter and a second hardware event counter, and being coupled with the addressable memory to access said machine executable instructions, wherein responsive to said machine executable instructions, said processor is to:
    count occurrences of a segment register load event in the first hardware event counter;
    count occurrences of a second hardware event in the second hardware event counter;
    sample the second hardware event counter after a specified number of occurrences of the first hardware event have been counted, and reset the first and second hardware event counters, wherein both the first hardware event counter and the second hardware event counter of the processor are to be utilized for a particular process and/or thread without including contamination from events captured from other processes and/or threads.

23. The computing system of claim 22 wherein responsive to said machine executable instructions, said processor is to:
  record the sampled second hardware event counter value with a process identifier value.

24. The method of claim 23 wherein responsive to said machine executable instructions, said processor is to:
  record the sampled second hardware event counter value and the process identifier value with a thread identifier value.

25. A computing system comprising:
  an addressable memory to store data and machine executable instructions for performing context switch sampling;
  a processor including a first hardware event counter and a second hardware event counter, and being coupled with the addressable memory to access said machine executable instructions, wherein responsive to said machine executable instructions, said processor is to:
    count occurrences of a first hardware event in the first hardware event counter;
    count occurrences of a second hardware event in the second hardware event counter;
    sample the second hardware event counter after a specified number of occurrences of the first hardware event have been counted, and reset the first and second hardware event counters, wherein both the first hardware event counter and the second hardware event counter of the processor are to be utilized for a particular process and/or thread without including contamination from events captured from other processes and/or threads.

26. The computing system of claim 25 wherein responsive to said machine executable instructions, said processor is to:
  record the sampled second hardware event counter value with a process identifier value.

27. The computing system of claim 25 wherein responsive to said machine executable instructions, said processor is to:
  record the sampled second hardware event counter value with a thread identifier value.

28. The computing system of claim 25 wherein said first hardware event is a descriptor table load event.

29. The computing system of claim 28 wherein said first hardware event is a local descriptor table load event.

30. The computing system of claim 25 wherein said first hardware event is a segment register load event.

31. The computing system of claim 25 wherein said first hardware event is a memory load event from an address predetermined to trigger the sampling of the second hardware event counter.

32. The computing system of claim 25 wherein said first hardware event is a process identifier change event.

33. The computing system of claim 25 wherein said first hardware event is a thread identifier change event.

* * * * *